(12) United States Patent
Shi et al.

(10) Patent No.: US 7,686,261 B2
(45) Date of Patent: Mar. 30, 2010

(54) SUPPORTING BRACKET ASSEMBLY

(75) Inventors: Zheng Shi, Shenzhen (CN); Jun Zhang, Shenzhen (CN); Yue-Hai Zhang, Shenzhen (CN); Wen-Kang Lo, Tu-Cheng (TW); Chien-Li Tsai, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 400 days.

(21) Appl. No.: 11/309,473

(22) Filed: Aug. 11, 2006

(65) Prior Publication Data

US 2007/0075201 A1    Apr. 5, 2007

(30) Foreign Application Priority Data

Aug. 16, 2005  (CN)  .................... 2005 2 0063432 U

(51) Int. Cl.
    *F16M 11/38*   (2006.01)
(52) U.S. Cl. ...................................... 248/166; 248/351
(58) Field of Classification Search ................. 248/463, 248/464, 917–923, 456, 447, 166, 126, 351; 361/681, 680, 683
See application file for complete search history.

(56) References Cited

U.S. PATENT DOCUMENTS

| 2,018,988 | A | * | 10/1935 | Woodall ..................... 248/456 |
| 5,235,495 | A | * | 8/1993 | Blair et al. ................... 361/680 |
| 6,113,047 | A | * | 9/2000 | Wung et al. ............... 248/284.1 |
| 6,256,192 | B1 | | 7/2001 | Shannon |
| 6,325,346 | B1 | * | 12/2001 | Chang et al. ........... 248/225.11 |
| 6,583,985 | B2 | * | 6/2003 | Nguyen et al. .............. 361/686 |
| 6,644,611 | B1 | * | 11/2003 | Tai ......................... 248/292.13 |
| 6,975,507 | B2 | * | 12/2005 | Wang et al. .................. 361/683 |
| 7,184,263 | B1 | * | 2/2007 | Maskatia ..................... 361/683 |
| 7,203,058 | B2 | * | 4/2007 | Hong ......................... 361/681 |
| 7,396,233 | B2 | * | 7/2008 | Lin ............................. 439/31 |
| 2005/0162821 | A1 | * | 7/2005 | Homer et al. ............... 361/683 |
| 2005/0225934 | A1 | * | 10/2005 | Homer et al. ............... 361/683 |
| 2007/0058331 | A1 | * | 3/2007 | Schwager et al. .......... 361/683 |
| 2007/0177344 | A1 | * | 8/2007 | Hsia .......................... 361/683 |
| 2008/0006749 | A1 | * | 1/2008 | Ferritto .................... 248/188.6 |

* cited by examiner

*Primary Examiner*—Amy J Sterling
(74) *Attorney, Agent, or Firm*—Wei Te Chung

(57) ABSTRACT

A supporting bracket assembly for supporting a base unit of a portable computer includes a base, a supporting bracket, a locking member, and an operation portion. The supporting bracket is pivotably engaged with the base. The supporting bracket includes a supporting arm with a locking ring. A plurality of locking holes is defined in the locking ring. The locking member is slidably arranged in the base. The locking member includes a positioning post. The positioning post is selectively inserted in one of the locking holes of the supporting arm to lock the supporting bracket. The operation portion is connected with the locking member, and the locking member is driven by the operation portion to slide for locking or unlocking the supporting bracket.

13 Claims, 9 Drawing Sheets

SUPPORTING BRACKET ASSEMBLY

FIELD OF THE INVENTION

The present invention relates to supporting bracket assemblies, and particularly to a supporting bracket assembly whose opening angle is adjustable freely.

DESCRIPTION OF RELATED ART

Portable computers, such as laptop computers and notebook computers, have become increasingly popular for general use. A portable computer includes several electrical components, such as a motherboard, a central processing unit (CPU), hard disk drives (HDDs), compact disk-read only memory (CD-ROM) drives, heat sinks, and so on. Generally, the electrical components are received in a chassis, under a keyboard of the portable computer. When the portable computer is being used, the chassis is supported by a support like a desktop, which limits heat dissipation of the portable computer.

To solve the above problem, the electrical components of some portable computers are assembled in a chassis behind a Liquid Crystal Display (LCD) of the portable computer. When one of the portable computers is being used, the keyboard of the portable computer is supported on a surface, and the chassis contacts with the air. Obviously, this structure of the portable computers is very easy for the heat produced by the electrical components to dissipate. However, the weight of the base unit is too heavy for the LCD to be retained in a predetermined position. A supporting bracket is usually provided for supporting the base unit and the LCD.

What is needed, therefore, is a supporting bracket assembly whose opening angle is adjustable freely.

SUMMARY OF THE INVENTION

An exemplary supporting bracket assembly for supporting a base unit of a portable computer is provided. The supporting bracket assembly includes a base, a supporting bracket, a locking member, and an operation portion. The supporting bracket is pivotably engaged with the base. The supporting bracket includes a supporting arm with a locking ring. A plurality of locking holes is defined in the locking ring. The locking member is slidably arranged in the base. The locking member includes a positioning post. The positioning post is selectively inserted in one of the locking holes of the supporting arm to lock the supporting bracket. The operation portion is connected with the locking member, and the locking member is driven by the operation portion to slide for locking or unlocking the supporting bracket.

Other advantages and novel features will become more apparent from the following detailed description of preferred embodiment when taken in conjunction with the accompanying drawings, in which:

DETAILED DESCRIPTION OF THE INVENTION

Figure 1:
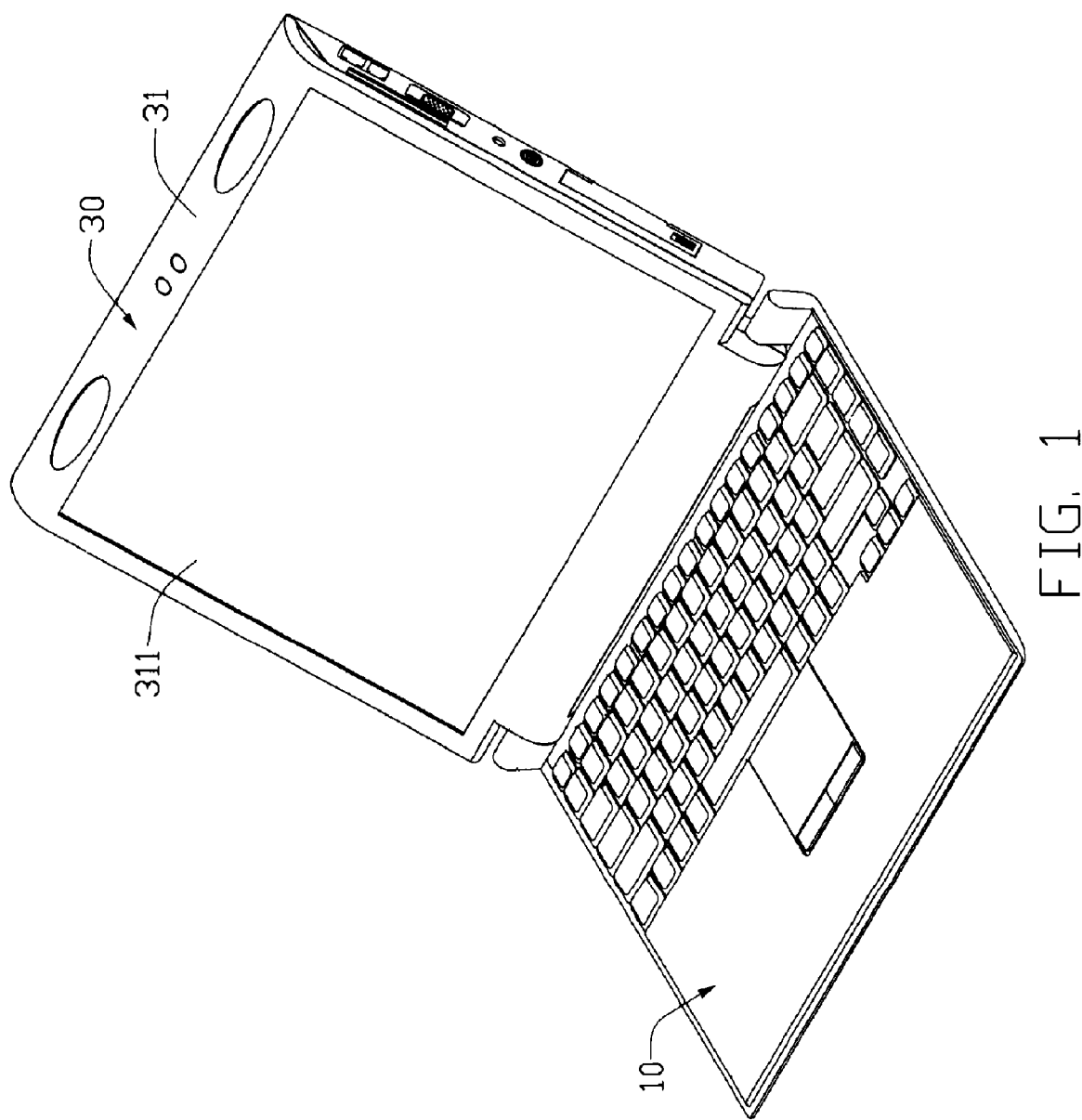
FIG. 1 is an isometric view of a portable computer with a supporting bracket assembly in accordance with a preferred embodiment of the present invention.
Figure 2:
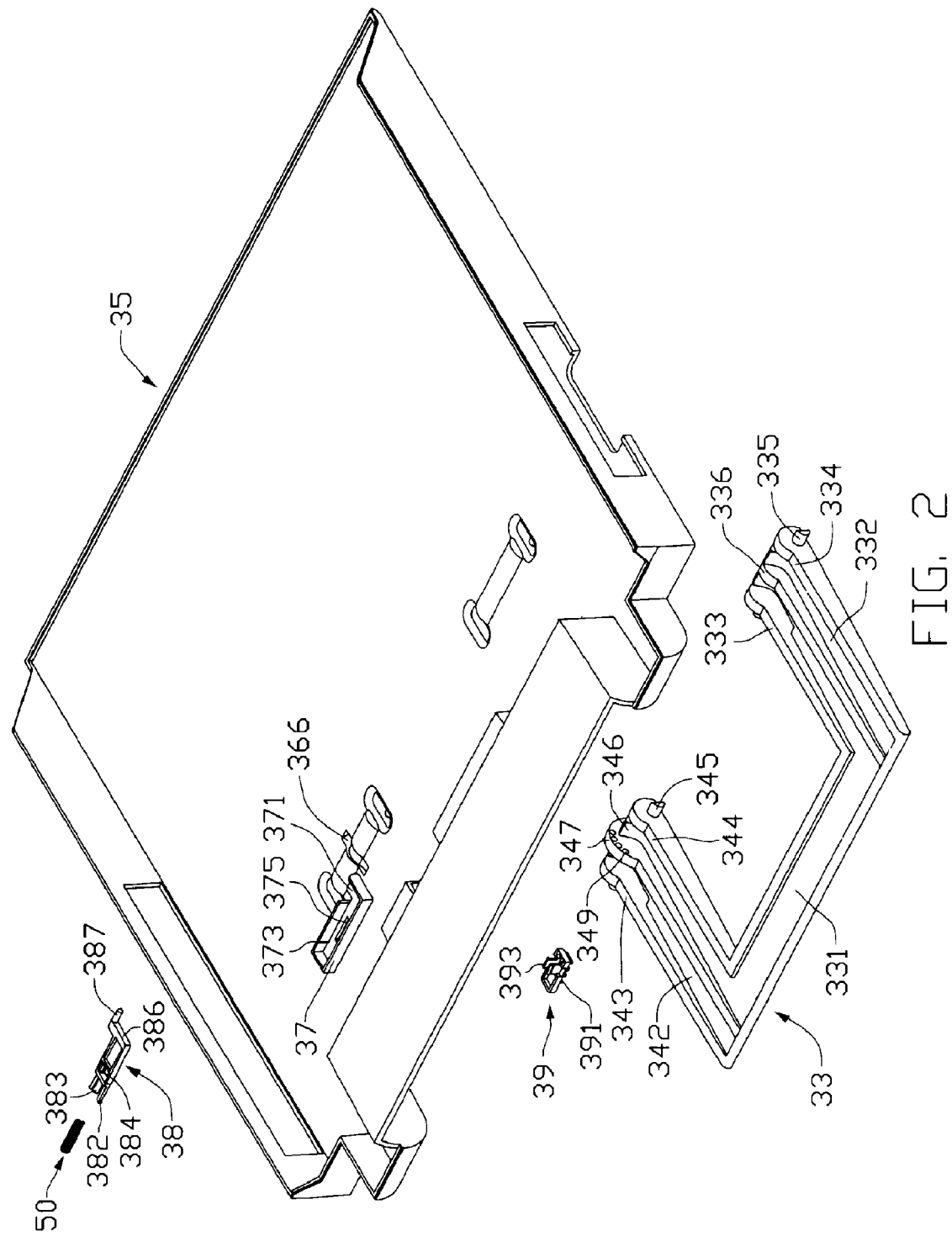
FIG. 2 is an exploded, isometric view of the supporting bracket assembly of FIG. 1, the supporting bracket assembly including a base, a supporting bracket, and a locking member.

Referring to FIGS. 1 to 2, a supporting bracket assembly in accordance with a preferred embodiment of the present invention is provided to be used in an electronic device like a portable computer. The portable computer includes a keyboard 10 and a base unit 30 pivotably connected with the keyboard 10. The base unit 30 includes a chassis 31, electrical components, such as a motherboard, a central processing unit (CPU), hard disk drives (HDDs), compact disk-read only memory (CD-ROM) drives, and heat sinks, are received in the chassis 31. The chassis 31 includes a Liquid Crystal Display (LCD) 311 and a base 35. The supporting bracket assembly includes a supporting bracket 33, the base 35, a locking member 38, and an operation portion 39. Typically, the base 35 of the supporting bracket assembly is a part of the base unit 30.

Figure 3:
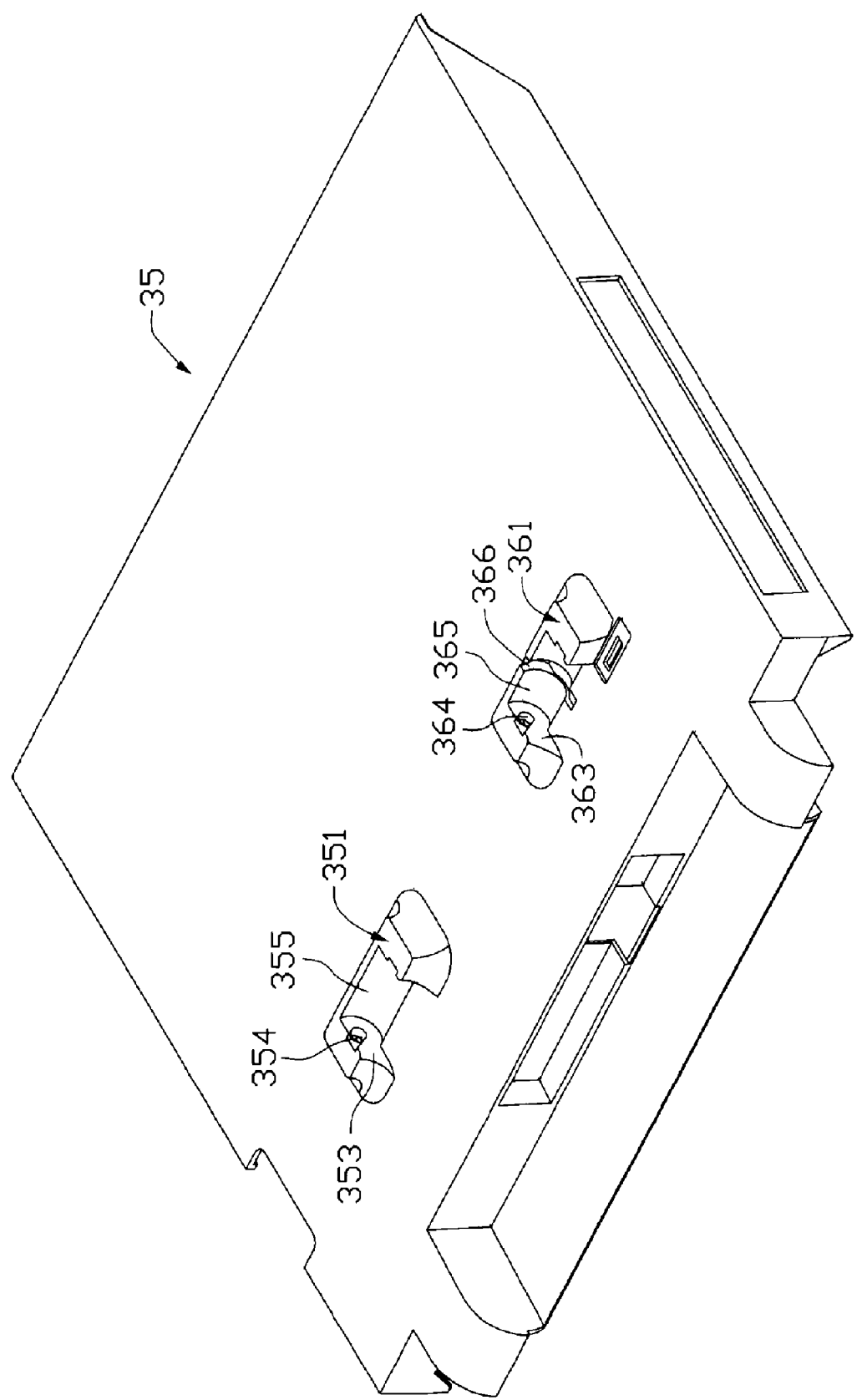
FIG. 3 is an enlarged isometric view of the base of FIG. 2 from another aspect.
Figure 4:
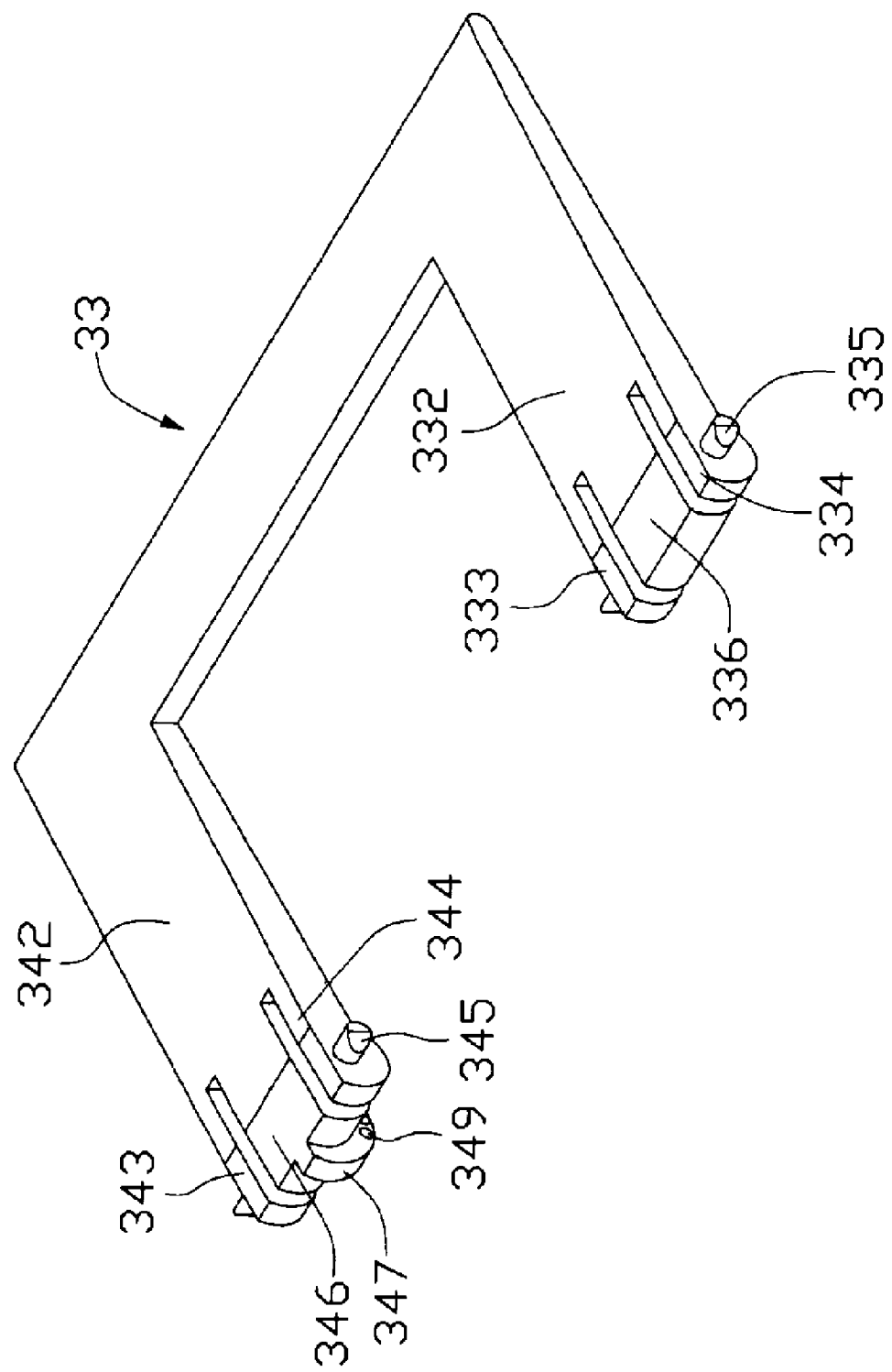
FIG. 4 is an enlarged isometric view of the supporting bracket of FIG. 2 from another aspect.

Referring also to FIGS. 3 and 4, the supporting bracket 33 includes a supporting beam 331 and two supporting arms 332, 342 extending from two ends of the supporting beam 331, respectively. A free end of the first supporting arm 332 is divided into three parts including a resilient left part 333, a resilient right part 334, and a middle part 336. A top end of the left part 333 has a cambered surface, and a pivot 335 extends from a left wall of the left part 333. The pivot 335 includes an inclined surface on a free end to aid assembly of the supporting bracket 33. The right part 334 is a mirror image to the left part 333. A top end of the middle part 336 has a cambered surface, too. A free end of the second supporting arm 342 is divided into three parts including a resilient left part 343, a resilient right part 344, and a middle part 346. The left part 343 and the right part 344 with pivots 345 are same as the left part 333 and the right part 334 of the first supporting arm 332, so they are not described in detail. A top end of the middle part 346 has a cambered surface, too. A locking ring 347 is formed on the middle of the top end of the middle part 346. A plurality of locking holes 349 is defined adjacent to a flange of the locking ring 347.

The supporting bracket 33 is attached to the base 35. The base 35 includes two receiving portions 351, 361 configured to receive the supporting arms 332, 342 of the supporting bracket 33. The receiving portions 351, 361 protrude from an outer surface of the base 35. The first receiving portion 351 forms two vertical spaced side panels 353. Each side panel 353 defines a receiving hole 354 for receiving the pivots 335 of the first supporting arm 332. A concave surface 355 is formed between the side panels 353, and forms a space between the concave surface 355 and the side panels 353 for receiving the left part 333, the right part 334, and the middle part 336 of the first supporting arm 332. The second receiving portion 361 is similar to the first receiving portion 351. The second receiving portion 361 forms two vertical spaced side panels 363. Each side panel 363 defines a receiving hole 364 for receiving the pivots 345 of the second supporting arm 342. A concave surface 365 is formed between the side panels 363, and forms a space between the concave surface 365 and the side panels 363 for receiving the left part 343, the right part 344, and the middle part 346, of the second supporting arm 342. A through slot 366 is defined through the middle of the concave surface 365 corresponding to the locking ring 347. A restricting portion 37 is formed on an inner surface of the base 35, adjacent to the through slot 366 of the second receiving portion 361. The restricting portion 37 is a rectangle frame with a cutout 371 adjacent to the second receiving portion 361. A pair of ribs 373 is formed on inner sides of the restricting portion 37, and a sliding groove 375 is defined through the base 35.

Figure 5:
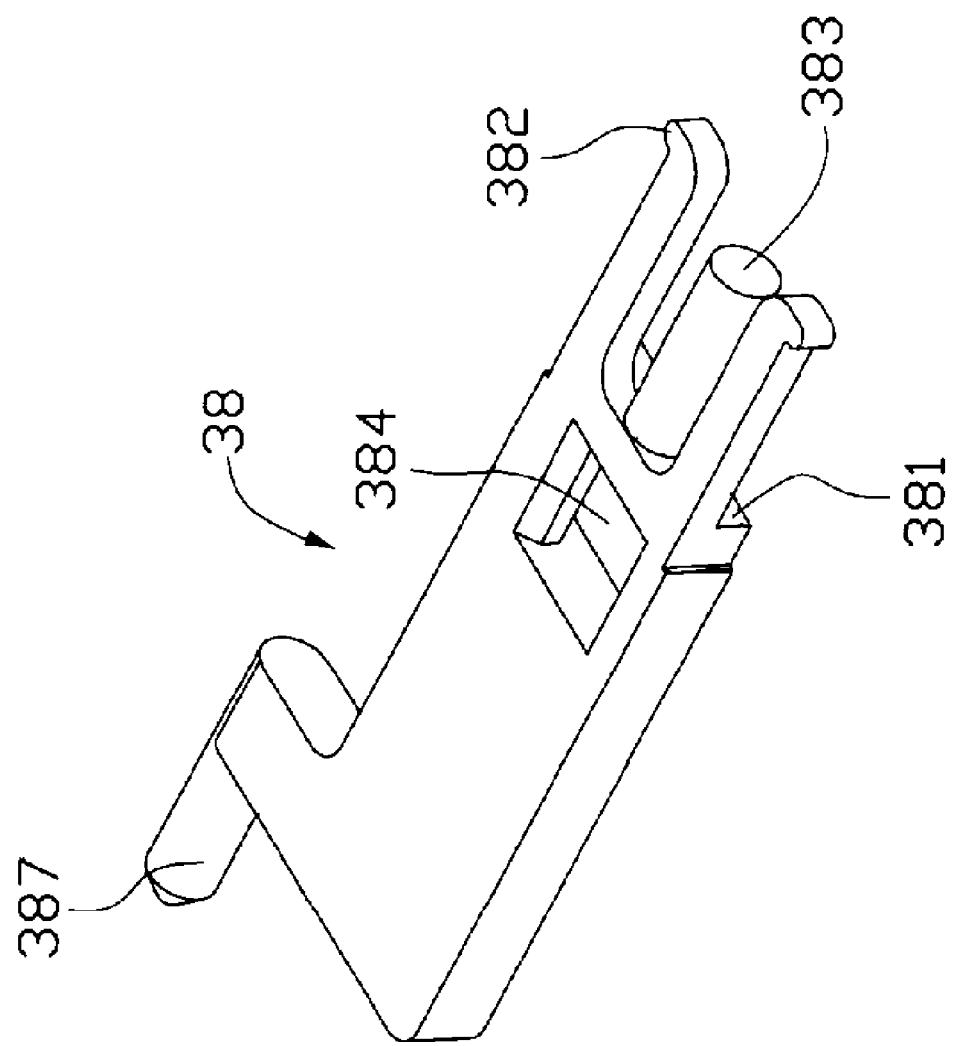
FIG. 5 is an enlarged isometric view of the locking member of FIG. 2.

Referring also to FIG. 5, the locking member 38 is slidably connected to the inner surface of the base 35. A pair of hooks 382 extends from an end 381 of the locking member 38 corresponding to the ribs 373 of the restricting portion 37, and a protruding post 383 extends from the locking member 38 between the hooks 382. An end of a resilient element 50, such as a spring, coils around the protruding post 383. An assembling hole 384 is defined in the body of the locking member 38 corresponding to the sliding groove 375 of the restricting portion 37. An L-shaped locking portion 386 is formed on another end of the locking member 38. The locking portion 386 includes a positioning post 387 corresponding to the locking holes 349 of the locking ring 347 of the supporting bracket 33.

The operation portion 39 includes a manipulating section 391 and a pair of clasps 393. The manipulating section 391 forms a plurality of ridges on a back surface thereof for facilitating manual operation. The clasps 393 extend from an inner surface of the manipulating section 191.

Figure 6:
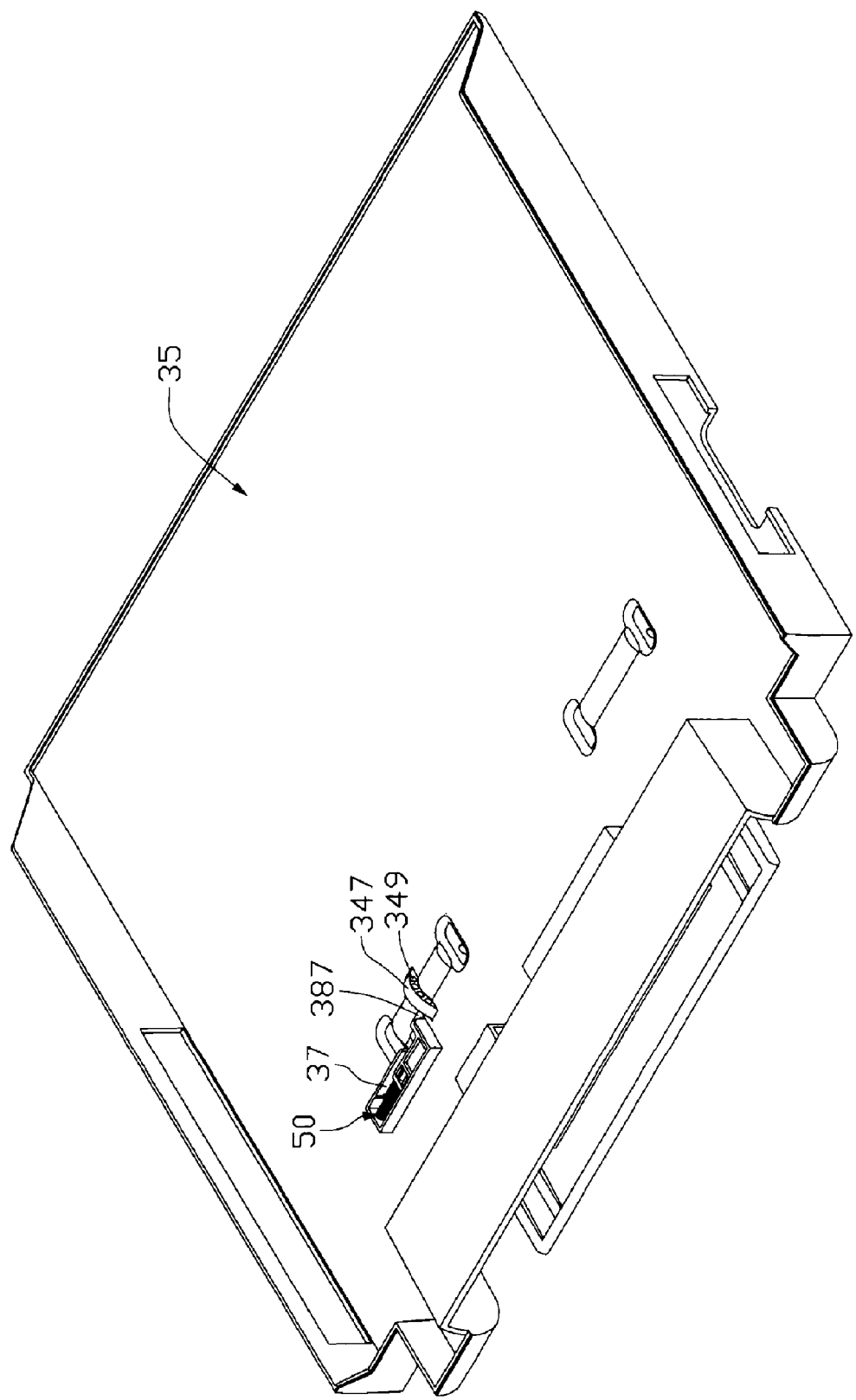
FIG. 6 is an assembled view of FIG. 2, showing the supporting bracket locked.
Figure 7:
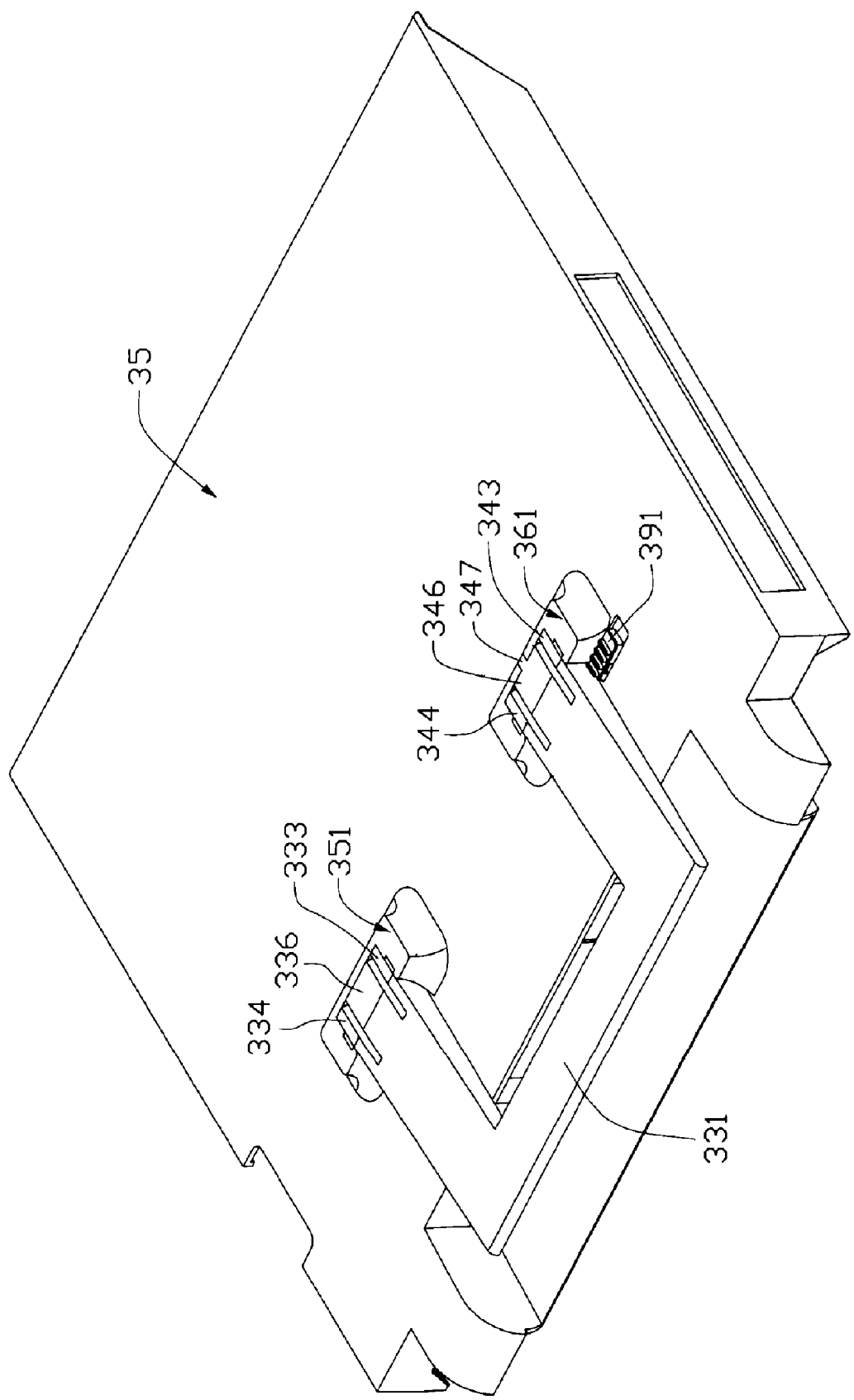
FIG. 7 is an inverted view of FIG. 6.

Referring also to FIGS. 6 and 7, in assembling the supporting bracket assembly, the locking member 38 is placed in the restricting portion 37, the clasps 393 extend though the sliding groove 375 and the assembling hole 384, and engage with the edges of the assembling hole 384. Thus, the operation portion 39 is arranged in an outer surface of the base 35, and the locking member 38 is arranged in the inner surface of the base 35 and can slide with the operation portion 39 along the sliding groove 375. An end of the resilient element 50 coils around the protruding post 383 of the locking member 38. The two ends of the resilient element 50 press against the end 381 of the locking member 38 and an inner side of the restricting portion 37, and the resilient element 50 is compressed. Guided by the inclines of the pivots 335,345 of the supporting arms 332,342, the pivots 335,345 are received in the receiving holes 354,364 of the receiving portions 351,361 of the base 35. Thus, the supporting bracket 33 pivotably engages with the base 35. The locking ring 347 of the second supporting arm 342 extends through the slot 366 of the second receiving portion 361, and the positioning post 387 of the locking member 38 is inserted into a locking hole 349 of the locking ring 347. Thus, the supporting bracket 33 is locked. The hooks 382 are stopped by the ribs 373 of the restricting portion 37 to maintain the locked state of the supporting bracket 33.

Figure 8:
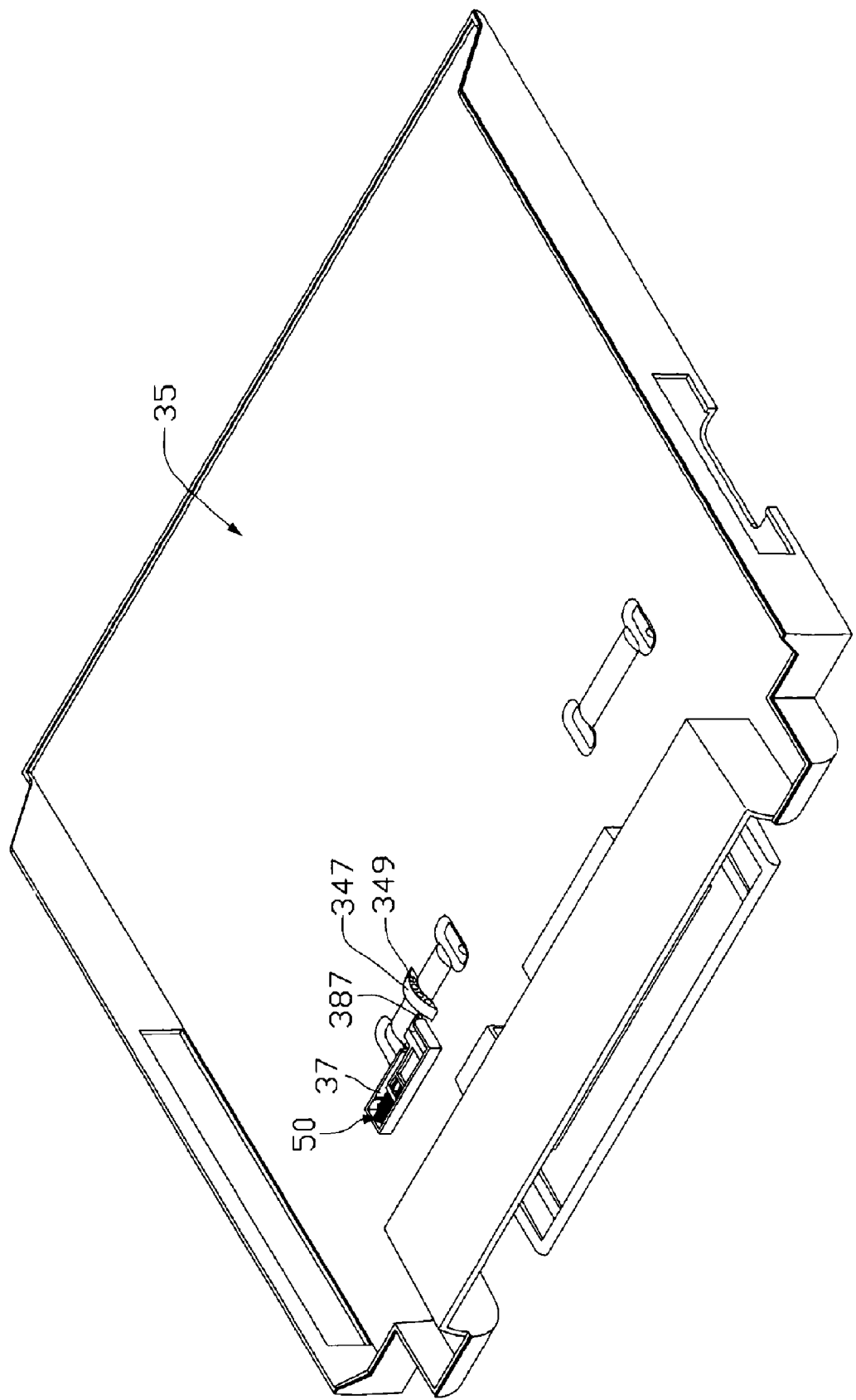
FIG. 8 is an assembled view of FIG. 2, showing the supporting bracket unlocked.
Figure 9:
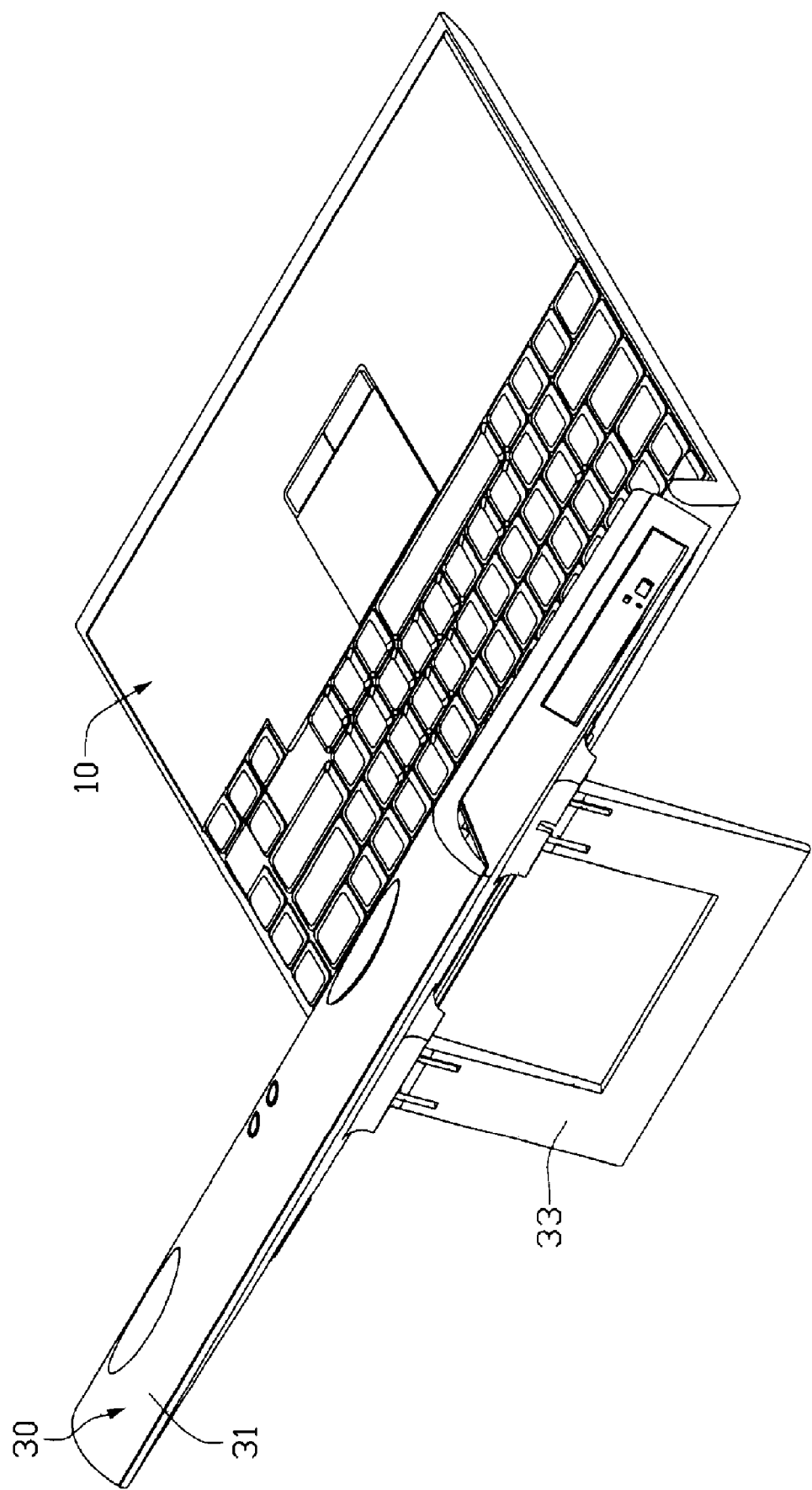
FIG. 9 is similar to FIG. 1, but viewed from another aspect.

Referring also to FIGS. 8 and 9, in adjusting the angle between the supporting bracket 33 and the base 35, the manipulating section 391 of the operation portion 39 is pushed to slide the operation portion 39, and the locking member 38 is driven by the operation portion 39 to slide along the sliding groove 375. The hooks 382 of the locking member 38 slide over the ribs 373 of the restricting portion 37, and the positioning post 387 is withdrawn from the locking hole 349 of the locking ring 347. The resilient element 50 is further compressed as shown in FIG. 8. The supporting bracket 33 is pivoted to a proper angle, the manipulating section 391 is released. The restoring force of the resilient element 50 pushes the locking member 38 to move back to its original position along the sliding groove 375. The positioning post 387 is inserted into another locking hole 349 of the locking ring 347. Thus, the supporting bracket 33 is locked at another angle. Prevention of unintentional unlocking of the supporting bracket 33, is accomplished when the manipulating section 391 of the operation portion 39 is pushed to slide the operation portion 39, and the locking member 38 is driven by the operation portion 39 to slide along the sliding groove 375, and the hooks 382 of the locking member 38 slide over the ribs 373 of the restricting portion 37. The ribs 373 stop the hooks 382 thus maintaining the locked state of the supporting bracket 33. By repeating the operation above, the supporting bracket 33 can be adjusted to different angles, and the base unit 30 is supported at a desired angle of a user.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A portable computer, comprising:
   a base unit comprising a base and a Liquid Crystal Display (LCD) attached to one side of the base;
   a keyboard pivotably connected with the base unit;
   a supporting bracket pivotably engaging with the base, the supporting bracket comprising a first supporting arm with a locking ring, a plurality of locking holes defined in the locking ring; and
   a locking member slidably arranged in the base, the locking member comprising a positioning post, the positioning post selectively inserted in one of the locking holes of the first supporting arm to lock the supporting bracket, wherein the locking ring is formed on an end of the first supporting arm, the base comprises a first receiving portion formed at an outside thereof, a through slot extends through the base, the end of the first supporting arm is received in the first receiving portion, and the locking ring extends from the outside of the base through the through slot to an inner side of the base before being locked by the positioning post of the locking member.

2. The portable computer as claimed in claim 1, wherein the supporting bracket comprises a second supporting arm, the base comprises a second receiving portion receiving an end of the second supporting arm.

3. The portable computer as claimed in claim 2, wherein each of the first and second supporting arms forms a pair of pivots at side walls of an end thereof, each of the first and second receiving portions defines a pair of receiving holes for receiving the pivots, respectively.

4. The portable computer as claimed in claim 3, wherein each pivot comprises an incline on a free end for aiding assembly.

5. The portable computer as claimed in claim 1, wherein a protruding post extends from an end of the locking member, a restricting portion is formed on an inner surface of the base, a resilient member coils around the protruding post, and two ends of the resilient member press against the end of the locking member and an inner side of the restricting portion respectively.

6. The portable computer as claimed in claim 1, further comprising an operation portion slidably attached to an opposite side of the base, wherein the locking member is capable of being driven by the operation portion to slide for locking or unlocking the supporting bracket.

7. A portable computer comprising:

a base unit comprising a base and a display attached to one side of the base, the base comprising an inner side facing the display, and an outer side parallel with the inner side and opposing the display;

a keyboard pivotably connected with the base unit a supporting bracket pivotably engaging with the outer side of the base, the supporting bracket comprising a first supporting arm, a locking ring formed on an end of the first supporting arm and extending through the inner side of the base, and a plurality of locking holes defined in the locking ring;

a locking member slidably attached to the inner side of the base, the locking member comprising a positioning post, wherein the positioning post is capable of being selectively inserted in one of the locking holes of the first supporting arm to lock the supporting bracket; and an operation portion parallelly attached to the outer side of the base and connected with the locking member, wherein the locking member is driven by the operation portion to slide for locking and unlocking the supporting bracket, wherein a protruding post extends from an end of the locking member, a restricting portion is formed on the inner side of the base, a resilient member coils around the protruding post, and two ends of the resilient member press against the end of the locking member and an inner side of the restricting portion respectively.

8. The portable computer as chimed in claim 7, wherein the base comprises a first receiving portion formed at the outer side thereof a through slot extends through the base, the end of the first supporting arm is received in the first receiving portion, and the locking ring extends from the outer side of the base through the through slot to the inner side of the base before being locked by the positioning post of the locking member.

9. The portable computer as claimed in claim 8, wherein the supporting bracket comprises a second supporting arm, the base comprises a second receiving portion receiving an end of the second supporting arm.

10. The portable computer as claimed in claim 9, wherein each of the first and second supporting arms forms a pair of pivots at side walls of an end thereof, each of the first and second receiving portions defines a pair of receiving holes for receiving the pivots, respectively.

11. The portable computer as claimed in claim 9, wherein the end of each of the first and second supporting arms has a cambered surface, and each of the first and second receiving portions forms a concave surface configured to fit the cambered surfaces respectively.

12. The portable computer as claimed in claim 7, wherein a pair of ribs is formed on inner sides of the restricting portion, and the locking member comprises a pair of hooks engaging with the ribs when the supporting bracket is locked.

13. The portable computer as claimed in claim 7, wherein the operation portion comprises a pair of clasps, the restricting portion comprises a sliding groove defined through the base, the locking member comprises an assembling hole, wherein the clasps extend through the sliding groove and the assembling hole, and engage with the edges of the assembling hole, whereby the locking member is slidable with the operation portion along the sliding groove.

* * * * *